June 26, 1956 W. L. RINGLAND 2,752,518
CONNECTOR FOR SYNCHRONOUS MACHINE DAMPER WINDING
Filed Nov. 2, 1953

Inventor
William L. Ringland
by T. Lloyd La Fave
Attorney

United States Patent Office 2,752,518
Patented June 26, 1956

2,752,518

CONNECTOR FOR SYNCHRONOUS MACHINE DAMPER WINDING

William L. Ringland, West Allis, Wis., assignor to Allis-Chalmers Manufacturing Company, Milwaukee, Wis.

Application November 2, 1953, Serial No. 389,561

6 Claims. (Cl. 310—183)

This invention relates to a dynamoelectric machine having a salient pole rotor provided with damper windings and particularly to the end connectors for the end ring segments for the damper windings.

In large high speed dynamoelectric machines having a salient pole rotor, the end ring for a damper winding in the pole face portions is normally made in segments to facilitate assembly. The segments may be joined to each other by connectors. The ring segments may be secured against centrifugal forces through the connectors which are secured to the rotor. Connectors so securing ring segments should allow for both axial displacement and circumferential expansion of the segments due to heating of the damper winding and ring segments. Distortion due to such expansion and displacement has caused weakening and breaking of a connector or segment.

According to the present invention such breaking of the connectors or ring segments is obviated by providing connectors which are flexible to circumferential expansion of the ring segments and which pivot with axial displacement of the ring segments. The connectors thus bend or flex in the circumferential direction where the expansion is a minimum and pivot in an axial direction where the expansion is a maximum while securing the ring segments against centrifugal forces and permitting displacement thereof due to heating.

It is therefore an object of the present invention to provide an improved means restraining the end ring segments for damper windings against centrifugal forces.

Another object of this invention is to provide a support for the end ring segments for damper windings of a salient pole rotor which permits distortion thereof circumferentially independently of displacement thereof axially of the rotor due to heating of the damper windings and ring segments.

Another object of this invention is to provide end connectors for damper segments which secure them against centrifugal forces and which permit circumferential and axial distortions by being flexible in one of these directions and pivoting in the other of these directions.

Other objects and advantages will be apparent to one skilled in the art upon a reading of the following description with the accompanying drawing, in which.

Figure 1:
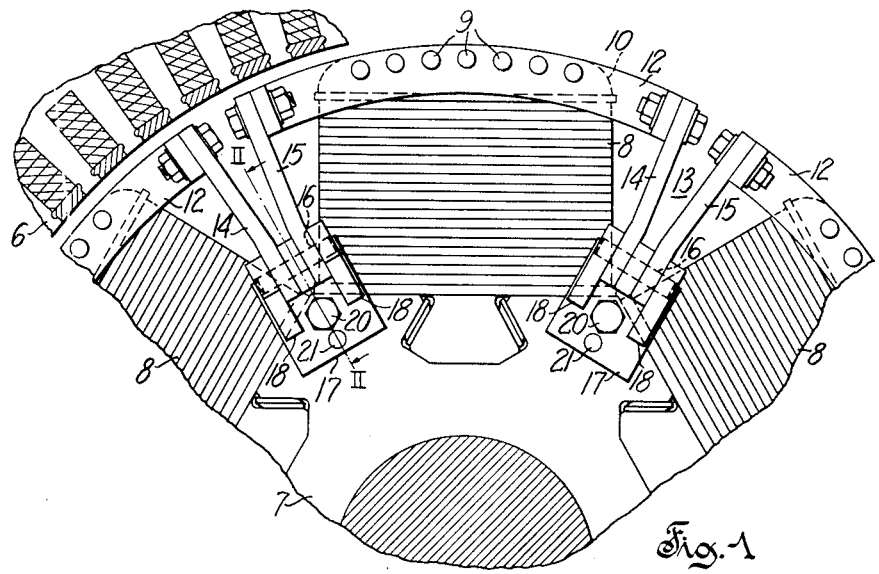
Fig. 1 is an end view partially in cross section of a portion of a synchronous salient pole dynamoelectric machine embodying the present invention.
Figure 2:
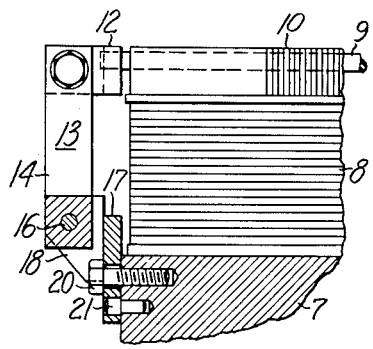
Fig. 2 is a view partially in cross section of a portion of the machine shown in Fig. 1 taken along the line II—II.

Referring to the drawing numeral 6 indicates a stator or primary winding member of usual construction of a large high speed synchronous motor. A rotor 7 or field winding member has a plurality of salient poles 8 so that the machine operates at a relatively high speed for its size. The centrifugal forces developed in the rotor member are therefore quite high.

Damper winding bars 9 are disposed in the pole face portions 10 of the salient poles. At each end of the poles these damper bars 9 are joined to an end ring made up of damper segments 12, one for each pole. At each end of the machine the segments of adjacent poles are joined by separate connectors 13.

Each connector 13 is substantially U-shaped and comprises a leg 14 having an end secured to an end of a segment 12 and a leg 15 having an end secured to the end of an adjacent segment 12. The other ends of legs 14 and 15 are joined together in good electrical connection and are secured by a pivot or hinge means to the rotor to rigidly hold the end ring segments against centrifugal forces. The pivot means comprises a steel pin 16 secured to the ends of the legs 14 and 15 and a plate 17 having a flange or hinge brackets 18 with the pin 16 journaled therein. The plate 17 may be secured to the rotor by welding or as shown by bolt 20 and a pin 21.

The steel pin 16 is rotatable in the journal provided by flange 18 and the axis of such pin and journal is normal to a plane extending axially of the rotor intermediate the adjacent poles whose damper segments are thus secured. The journal and pin thus provide a pivotal support for the legs of the connector which secures the segments against centrifugal forces while permitting the segments to move axially with little restraint as the damper winding bars expand or contract.

The legs 14 and 15 of each connector diverge from each other substantially radially outward. Heating of the segments causes expansion thereof which bends legs 14 and 15 circumferentially toward each other. Because of the substantially radial position of the legs, their bending toward each other follows substantially the arc of the segments and produces a minimum of radial distortion in the ends of the segments. This bending of the legs 14 and 15 is within the elastic limit of the material. The cross section of each leg is such that circumferential bending readily occurs with expansion and contraction of the segments while securing the segments against centrifugal forces. The legs 14 and 15 may be suitably laminated to provide increased flexibility circumferentially of the rotor.

Heating of the damper bars and of the segments, while causing circumferential expansion and axial displacement of the segments, causes bending of the connector legs only in a circumferential direction for which flexibility is provided, the axial displacement being taken up by pivoting of the connector.

Figure 3:
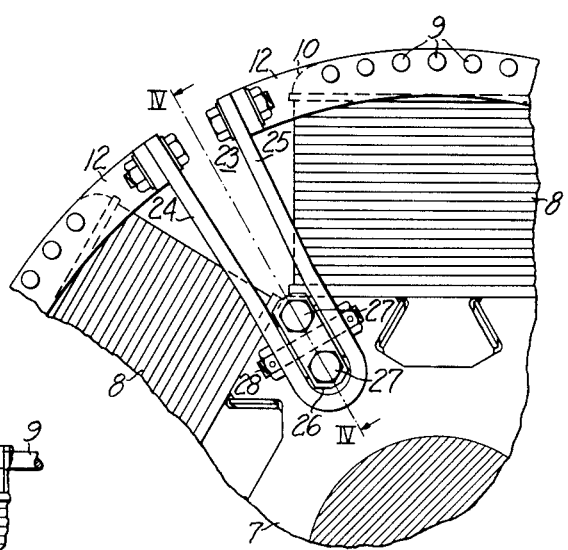
Fig. 3 is an end view partially in cross section of a salient pole dynamoelectric machine provided with a modification of the damper winding connector shown in Fig. 1.
Figure 4:
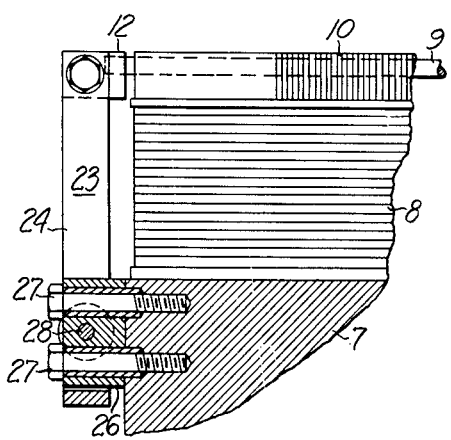
Fig. 4 is a view partially in cross section of the machine shown in Fig. 3 taken along the line IV—IV.

Fig. 3 shows a U-shaped connector 23 having legs 24, 25 joined by a bight or loop portion integral therewith. The free ends of the legs are connected to the ends of adjacent segments. A block 26 secured to the end of the rotor 7 by suitable bolts 27 is enclosed by the legs and the loop. A pin 28 secured in the block extends through the legs adjacent the loop for pivotally supporting the connector to the rotor. The pin is disposed in the block away from the rotor so that the loop portion which pivots toward the rotor upon expansion of the damper bars does not abut the rotor.

While only two embodiments of this invention have been shown and described, it will be apparent to one skilled in the art that various changes or modifications may be made therein without departing from the spirit of the invention or from the scope of the appended claims.

It is claimed and desired to secure by Letters Patent:
1. In a dynamoelectric machine having a rotor with circumferentially spaced salient poles having damper windings and damper segments with a segment disposed at the opposite ends of each of said damper windings, means securing one end of each of said segments to said rotor, said means including a member attached at radially spaced points thereof to an end of said segment and to said rotor, respectively, with the portion of said member intermediate said spaced points providing for circumferential movement of the end of said segment with respect to said rotor, and means pivotably connecting said member to said rotor to provide for movement of said segment axially of said rotor upon temperature changes of said damper winding.

2. A dynamoelectric machine having a salient pole rotor, damper winding bars in the pole face portions of the salient poles, damper segments for the bars of each salient pole, a connector for joining adjacent segments, said connector being secured to the rotor to rigidly support said segments against centrifugal forces while providing flexible support for said segments circumferentially of said rotor and pivotal support for said segments permitting said segments to move axially of said rotor to take up the thermal expansions and contractions of said bars and said segments.

3. A dynamoelectric machine having a salient pole rotor, damper winding bars in the pole face portions of the salient poles, damper segments for the bars of each salient pole, a connector for joining adjacent segments, said connector comprising a radially extending member secured to an end of one said segment and pivotally secured to said rotor, said member supporting said end of said segment rigidly radially of said rotor, flexibly circumferentially of said rotor and pivotally axially of said rotor, whereby said connector supports the segments against centrifugal forces while taking up circumferential expansion and contraction of the segments and longitudinal elongation and contraction of the damper bars.

4. A dynamoelectric machine having a salient pole rotor, damper winding bars in the pole face portions of the salient poles, damper segments for the bars of each salient pole, a connector joining the ends of adjacent segments at one end of the rotor, said connector being flexible to expansion and contraction of said segments circumferentially of said rotor, and hinge means securing said connector to said rotor for taking up centrifugal forces on said segments, said hinge means permitting said connector to pivot about an axis normal to an axial plane through said rotor intermediate said segments to permit axial movement of said segments due to expansion and contraction of said bars.

5. A dynamoelectric machine having a salient pole rotor, damper winding bars in the pole face portions of the salient poles, damper segments for the bars of each salient pole, connectors joining the ends of adjacent segments at each end of the rotor, each said connector forming a loop extending radially inward between said segments, a pin extending through the loop portion of said connector normal to an axial plane through said rotor between said adjacent segments, and means supporting said pin on said rotor to secure said adjacent segments against centrifugal forces while permitting distortions due to heating of the bars, segments and connectors.

6. A dynamoelectric machine having a salient pole rotor, damper winding bars in the pole face portions of the salient poles, damper segments for the bars of each pole, a connector joining the segments of adjacent poles and securing said segments against centrifugal forces, said connector comprising a pair of legs and a pin secured to one end of each said leg, the other end of one said leg secured to one segment and the other end of the other said leg secured to the other segment, journal means mounted on said rotor for rotatably supporting said pin therein, said legs being flexible circumferentially of said rotor, the axis of said pin being normal to an axial plane through said rotor intermediate said poles, whereby heating of said bars moves said segments axially of said rotor with negligible restraint and heating of said segments causes circumferential bending of said legs of said connector.

References Cited in the file of this patent

UNITED STATES PATENTS

| 1,030,041 | Williamson | June 18, 1912 |
| 1,208,460 | Bisbee et al. | Dec. 12, 1916 |
| 1,908,158 | Mortensen | May 9, 1933 |